United States Patent
Fontanesi et al.

(10) Patent No.: US 12,352,777 B2
(45) Date of Patent: Jul. 8, 2025

(54) CONTROL CIRCUIT FOR A SENSOR, AN ELECTRICAL CONTROL UNIT FOR A WHEEL SPEED SENSOR, A METHOD OF OPERATING A WHEEL SPEED SENSOR, A METHOD OF CONTROLLING A SENSOR AND A COMPUTER PROGRAM

(71) Applicant: Infineon Technologies AG, Neubiberg (DE)

(72) Inventors: Simone Fontanesi, Villach (AT); Filippo Grillotti, Villach (AT); Alessandro Petri, Villach (AT); Massimiliano Zilli, Villach (AT)

(73) Assignee: Infineon Technologies AG, Neubiberg (DE)

( * ) Notice: Subject to any disclaimer, the term of this patent is extended or adjusted under 35 U.S.C. 154(b) by 168 days.

(21) Appl. No.: 18/181,755

(22) Filed: Mar. 10, 2023

(65) Prior Publication Data

US 2023/0213547 A1     Jul. 6, 2023

Related U.S. Application Data

(63) Continuation of application No. 17/314,216, filed on May 7, 2021, now Pat. No. 11,614,458.

(30) Foreign Application Priority Data

May 18, 2020 (DE) .......................... 102020113443.6

(51) Int. Cl.
*G01P 3/44*     (2006.01)
*G01B 21/22*     (2006.01)
*G01P 21/00*     (2006.01)

(52) U.S. Cl.
CPC ................ *G01P 3/44* (2013.01); *G01B 21/22* (2013.01); *G01P 21/00* (2013.01)

(58) Field of Classification Search
None
See application file for complete search history.

(56) References Cited

U.S. PATENT DOCUMENTS

| | | | |
|---|---|---|---|
| 4,597,081 A | 6/1986 | Tassone | |
| 5,650,779 A * | 7/1997 | Sugden | H02K 29/10 341/11 |

(Continued)

FOREIGN PATENT DOCUMENTS

| | | |
|---|---|---|
| DE | 69603643 T2 | 12/1999 |
| DE | 10132610 A1 | 2/2003 |
| WO | 2007014947 A1 | 2/2007 |

*Primary Examiner* — Raul J Rios Russo
*Assistant Examiner* — Carl F. R. Tchatchouang
(74) *Attorney, Agent, or Firm* — Harrity & Harrity, LLP

(57) ABSTRACT

A control circuit for a wheel speed sensor is provide. The control circuit includes an input interface configured to receive high-resolution wheel speed data and low-resolution wheel speed data; and circuitry configured to determine information on a functional state of the wheel speed sensor using the high-resolution data and the low-resolution data. The circuitry is configured to detect a failure state of the wheel speed sensor if a number of signal events which are signaled by the high-resolution wheel speed data between a first signal event and a second signal event deviates from an expected number. The first signal event and the second signal event are signaled by the low-resolution wheel speed data.

20 Claims, 9 Drawing Sheets

(56) References Cited

U.S. PATENT DOCUMENTS

| | | |
|---|---|---|
| 8,368,388 B2 | 2/2013 | Lohberg et al. |
| 11,614,458 B2 | 3/2023 | Fontanesi et al. |
| 2003/0183024 A1 | 10/2003 | Lohberg et al. |
| 2005/0162159 A1 | 7/2005 | Lohberg et al. |
| 2014/0163834 A1 | 6/2014 | Kim |
| 2018/0024156 A1* | 1/2018 | Welsch ................ B60T 13/662 123/406.61 |
| 2018/0117975 A1 | 5/2018 | Choi |
| 2018/0209820 A1* | 7/2018 | Hammerschmidt .... G01P 21/02 |
| 2018/0231392 A1* | 8/2018 | Kiyomura ................ G01D 3/08 |
| 2019/0353677 A1 | 11/2019 | Lim et al. |

\* cited by examiner

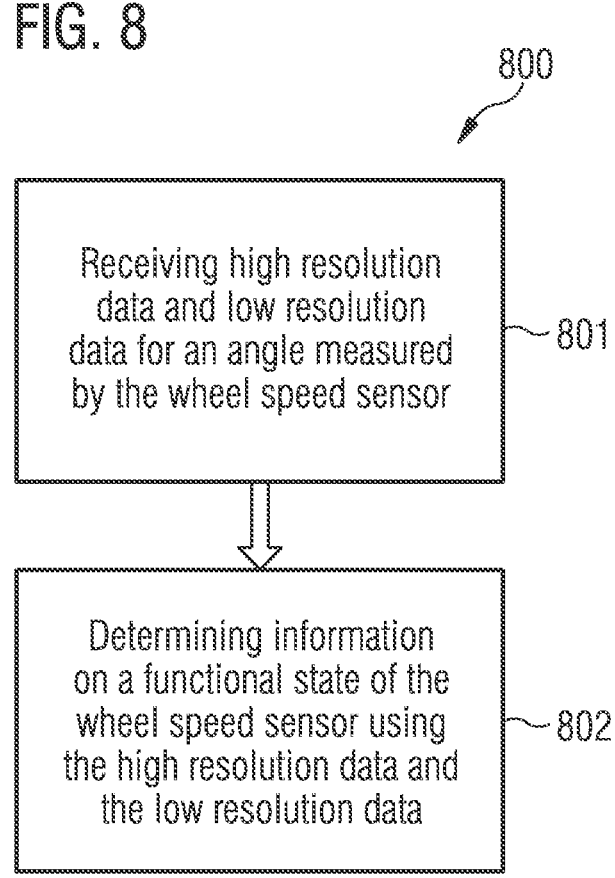

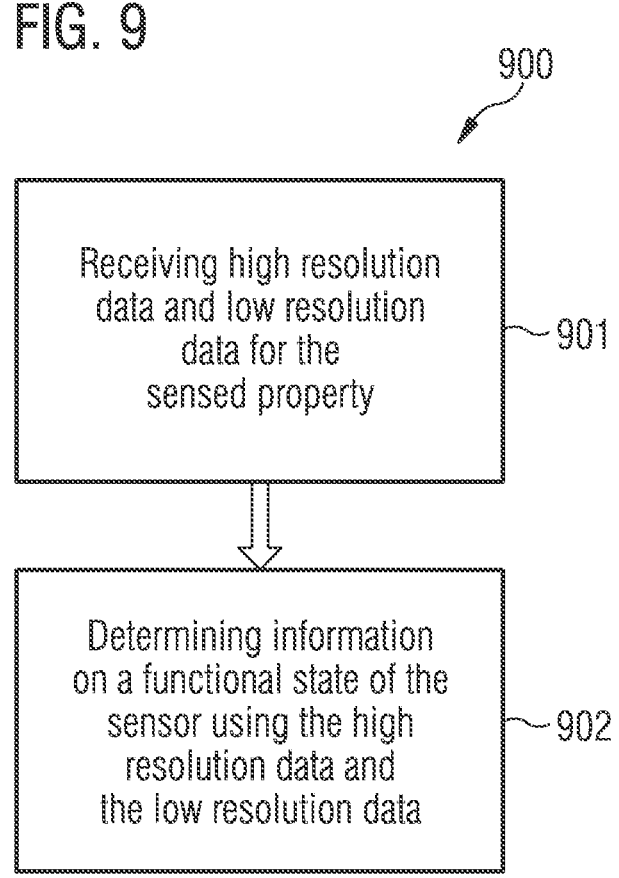

CONTROL CIRCUIT FOR A SENSOR, AN ELECTRICAL CONTROL UNIT FOR A WHEEL SPEED SENSOR, A METHOD OF OPERATING A WHEEL SPEED SENSOR, A METHOD OF CONTROLLING A SENSOR AND A COMPUTER PROGRAM

RELATED APPLICATION

This application is a continuation of U.S. patent application Ser. No. 17/314,216, filed May 7, 2021 (now U.S. Pat. No. 11,614,458), which claims priority to German Patent Application No. 102020113443.6, filed on May 18, 2020, which are incorporated herein by reference in their entirety.

FIELD

Examples relate to a control circuits for sensors, electrical control units for wheel speed sensors, methods of operating wheel speed sensors, methods of controlling sensors and computer programs.

BACKGROUND

Wheel speed sensors can be used to determine a rotational speed and optionally also a direction of rotation of a wheel. In some implementations, the movement of the wheel causes a change in a magnetic field of the sensor by means of an encoder. Wheel speed sensors may, for example, comprise Hall elements to detect the change of the magnetic field. The Hall elements generate an alternating voltage signal while the wheel is in rotation. The alternating voltage signal value can be encoded into digital output protocols to signal the rotational speed and/or the direction in a speed or direction channel.

Some speed sensors implement a crosscheck mechanism which can activate a safety mechanism by comparing the signals of the speed and direction channels. The crosscheck mechanism can determine information on a functional state of the sensor.

There is still a demand to improve an operation or control of sensors to make conclusions on their functional states.

SUMMARY

According to an embodiment, a control circuit for a sensor that determines a sensed property comprises an input interface configured to receive high-resolution data and low-resolution data for the sensed property. The control circuit further comprises circuitry configured to determine information on a functional state of the sensor using the high-resolution data and the low-resolution data. Comparing the high-resolution data and low-resolution data for the sensed property may allow conclusions to be made on the functional state of the sensor, for example by performing consistency checks.

An embodiment of an electrical control unit (ECU) for a wheel speed sensor comprises an input interface configured to receive high-resolution data and low-resolution data for an angle measured by the wheel speed sensor. The electrical control unit further comprises circuitry configured to determine information on a functional state of the wheel speed sensor using the high-resolution data and the low-resolution data. Since both data describe an identical rotation, comparison between high-resolution data and low-resolution data or consistency checks based on said data may allow a conclusion to be made whether the functional state of the wheel speed sensor is as expected.

BRIEF DESCRIPTION OF THE DRAWINGS

Some examples of apparatuses and/or methods will be described in the following by way of example only, and with reference to the accompanying figures, in which

FIG. 8 illustrates a flow chart of an embodiment of a method of operating a wheel speed sensor; and FIG. 9 illustrates another flow chart of an embodiment of a method for controlling a sensor.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
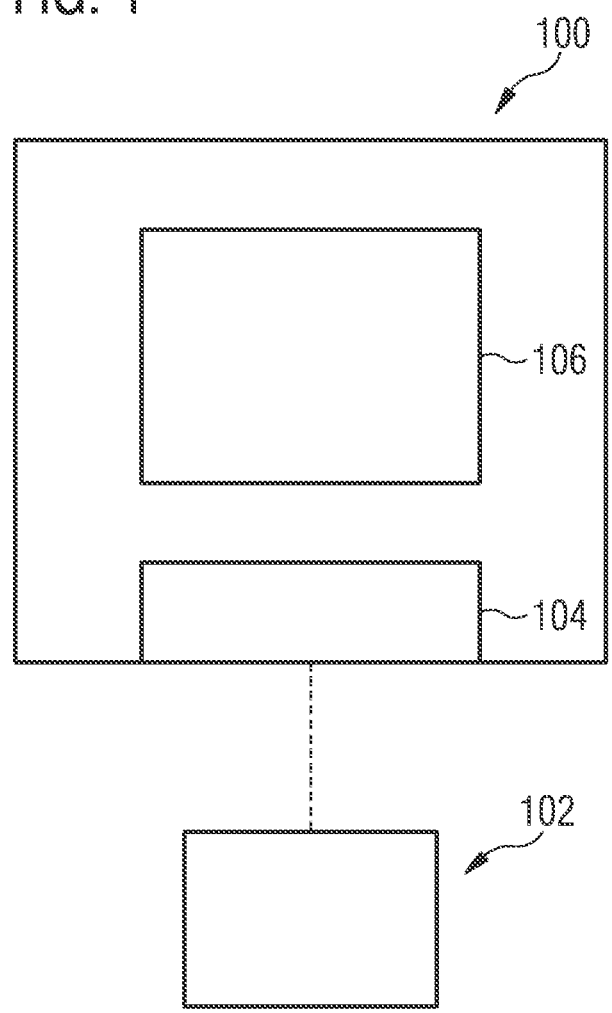
FIG. 1 illustrates an embodiment of a control circuit for a sensor.

FIG. 1 illustrates an embodiment of a control circuit 100 for a sensor 102 that determines a sensed property. The sensed property may be arbitrary, for example, a magnetic field, intensity of light, an angle, a distance or a shape of an object. The control circuit 100 for the sensor 102 comprises an input interface 104 configured to receive high-resolution data and low-resolution data for the sensed property. For example, the data may signal events sensed by the sensor by a digital or analog protocol. An event may, for example, be signaled every time the sensed property exhibits a specific state or quantity. In the event of a wheel speed sensor sensing a magnetic field strength, an event may, for example, be signaled every time the alternating voltage output of magnetic sensor elements crosses zero. For sensors discussed herein, high-resolution data may correspond to sensing of a first type of event and the low-resolution data may correspond to sensing of a second type of event. Hence, received data may comprise different event records and a different number of event records of high-resolution data and low high-resolution data at a given time interval.

The control circuit 100 further comprises circuitry 106 configured to determine information on a functional state of the sensor 102 using the high-resolution data and the low-resolution data. The determined functional state of the sensor 102 may indicate proper functioning if the received data is consistent. Likewise, the functional state of the sensor 102 may indicate malfunction if the received data is inconsistent. Since high-resolution data and low-resolution data both describe the identical sensed property, the circuitry can determine the functional state of the sensor by analyzing the high-resolution data with the low-resolution data with respect to their consistency.

In an embodiment of the control circuit 100 the input interface 104 is configured to receive high-resolution data indicative of a first increment of the sensed property. Further, the input interface 104 is configured to receive low-resolution data indicative of a second increment of the sensed property, wherein the second increment is bigger than the first increment. Such high-resolution data and low-resolution data is, for example, received by a controller of a wheel speed sensor discussed subsequently. In another example, the sensed property may be a distance continuously measured by the sensor 102. The sensor 102 may record an event at each increment the distance changes. For example, the first increment may equal 10 cm for the high-resolution data and the second increment may equal 40 cm for the low-resolution data. Since the second increment is bigger than the first increment, events corresponding to the high-resolution data may be sensed more frequently compared to events corresponding to low-resolution data. In the previously given example, for every increment signaled by the low-resolution data, 4 increments signaled by the high-resolution data is expected. If this ratio is not observed, one may make a conclusion whether there is an error in the sensor of any kind.

In an embodiment of the control circuit 100, the input interface 104 may further be configured to receive a signal of a first signal type if the sensed property changed by the first increment and a signal of a second signal type if the sensed property changed by the second increment. For the previously described example the signal of the first signal type may be received every time the sensor senses a change of the distance by 10 cm and the signal of the second signal type may be received every time the sensor senses a change of the distance by 40 cm. The signals of the first and the second signal type depend on the chosen protocol, and may, for example, be distinguished by their height, intensity, frequency, duration, modulation of the signal, or by other characteristics.

According to an embodiment of the control circuit 100 receiving different signal types for different events, the circuitry 106 is further configured to determine a failure state of the sensor 102 if a number of signals of the first signal type received between a pair of consecutive signals of the second signal type deviates from an expected number. As elaborated on before, a particular signal sequence can be expected in such applications and deviation from that sequence may indicate an error.

In another embodiment, the circuitry 106 is configured to determine a failure state of the sensor if a number of signals of the first signal type received consecutively without receiving a signal of the second signal type exceeds an expected number. Considering the previously described example after a signal of the second type, one may expect to receive three signals of the first signal type before another signal of the second signal is received. Hence, if four signals of the first signal type are received consecutively without receiving a signal of the second signal type the failure state of the sensor can be already determined. A failure state of the sensor can be determined without waiting for the reception of the second signal type, which allows to determine a failure state of a sensor faster than waiting for two subsequent signals of the second type.

Embodiments of the control circuit are not restricted to particular sensors. The associated sensors can be of different types detecting physical or chemical properties such as temperature, pressure, speed, electromagnetic field, electrochemical potential, brightness, acoustic or optical signal, pH-number and so on.

Depending on the type of sensor, the sensed property can be used to determine, e.g. a distance, an angle, an arc length, an intensity, a field strength, a time difference, a force, a torque, an acceleration, a density, a frequency, a concentration and much else.

Figure 2:
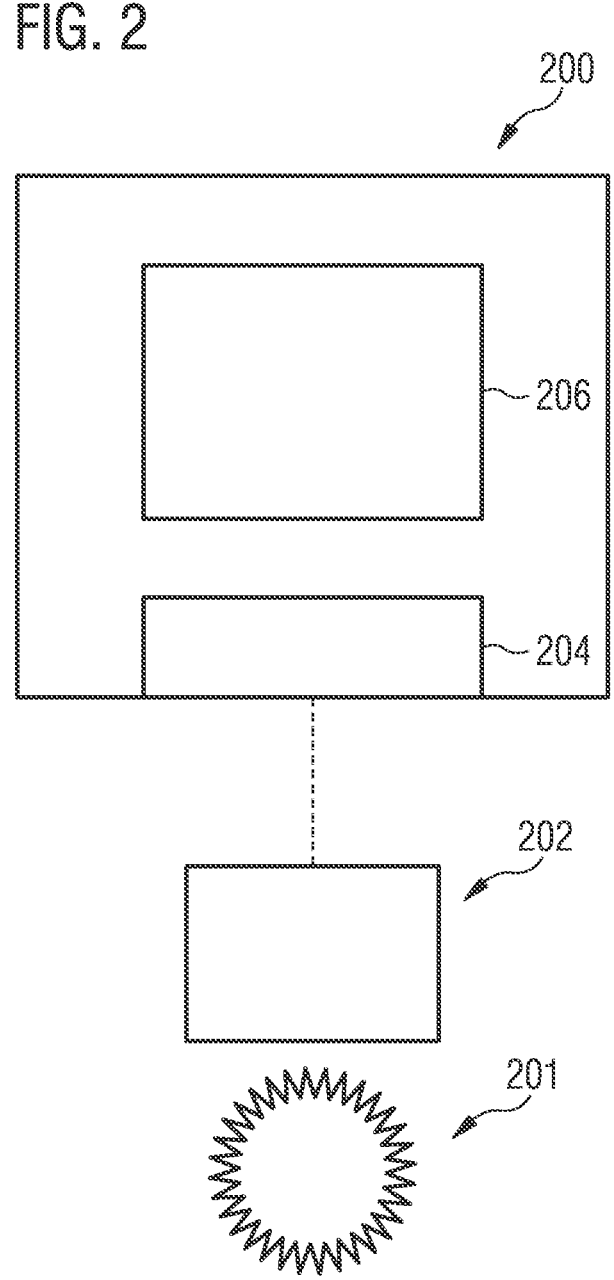
FIG. 2 illustrates an embodiment of an electrical control unit for a wheel speed sensor.

FIG. 2 illustrates another embodiment of the invention comprising an electrical control unit 200 for a wheel speed sensor 202 using e.g. a gear or an increment wheel 201 as an encoder. The wheel speed sensor 202 can be used in automotive industry such as for measuring a speed of a gear shaft, a speed of wheels, a position of a gear to trigger ignition, a direction of motion of a wheel and much else. The electrical control unit 200 for the wheel speed sensor 202 comprises an input interface 204 configured to receive high-resolution data and low-resolution data for an angle measured by the wheel speed sensor 202. The wheel speed sensor 202 can detect the angle of deflection caused by the rotation of the wheel 201. The evaluated signals may be generated by a change of magnetic field caused by the appearance and absence of teeth of the gear 201 or by permanent magnets arranged on the increment wheel 201. Induced signals can be encoded into data which can be sent to the input interface 204. For example, depending on the motion of the teeth of the gear or of the magnets on the increment wheel a high-resolution and low-resolution data can be generated and received by the input interface 204.

High-resolution data can determine a smaller angle of deflection than low-resolution data.

The electrical control unit 200 comprises circuitry 206 configured to determine information on a functional state of the wheel speed sensor 202 using the high-resolution data and the low-resolution data. The high and low-resolution data corresponds to the motion and known constitution of the wheel. Hence, by comparing high-resolution and low-resolution data, a functional state of the wheel speed sensor 202 can be determined. If high-resolution data and low-resolution data are inconsistent or do not match, a malfunction of the wheel speed sensor 202 can be assumed.

According to the embodiment illustrated in FIG. 2 the input interface 204 is further configured to receive high-resolution data indicative of a number of changes of a first increment of the angle and low-resolution data indicative of a number of changes of a second increment of the angle, wherein the second increment is bigger than the first increment. For example, the gear 201 comprises 60 teeth arranged by an angle of 6° corresponding to one cycle of e.g. a sinusoidal signal. The second increment of the angle can be 3° considering the angle between two zero crossings of the sinusoidal signal. The second increment of the angle can be considered in more detail by using the first increment of the angle to increase the resolution. For example, the first increment of the angle can be 1.5°. The second increment is bigger than the first increment such that a number of changes of the first increment is indicative of high-resolution data and the number of changes of the second increment is indicative of low-resolution data. The second increment may correspond e.g. to the arrangement of the teeth of the gear 201 or on the arrangement of permanent magnets 201 on the increment wheel. The first increment may correspond to e.g. fine-tuned patterns appearing along the second increments or more generally, along the wheel 201.

In the embodiment of the electrical control unit 200 the circuitry 206 is further configured to determine a failure state of the wheel speed sensor 202. The failure state is determined, if a number of changes of the first increment for a single change of the second increment deviates from an expected number. According to the previously described example comprising a first increment of 1.5° and a second increment of 3° for a sinusoidal signal with a cycle of 6°, the expected number of changes of 1.5° within a single change of 3° may be equal to one on the condition of a uniform arrangement of increments and a uniform motion of the wheel 201. If the number of changes of first increments within a single change of second increment is not equal to one, the failure state is determined. It can be assumed that the sensor is not working properly as the expectations are not met.

According to another embodiment of the electrical control unit 200, the circuitry 206 is configured to determine a failure state of the wheel speed sensor 202 if a number of consecutive changes of the first increment without a single change of the second increment exceeds an expected number. Compared to the previously described embodiment of the electrical control unit 200 the failure state of the wheel speed sensor 202 can be determined more quickly. If the number of consecutive changes of first increment of 1.5° exceeds the expected number of one within a total range of 3°, the failure state can be determined. Hence, the failure state can be determined if two consecutive changes of the first increment are received without a single change of the second increment. After exceeding the expected number, the reception of further data by the input interface can be neglected as further data will not be able to achieve the expected number subsequently.

In an embodiment of the invention an electrical control unit 200 is configured to change an operation mode from normal operation to failsafe operation if the failure state is determined. The electrical control unit 200 can change operation modes which may have the consequence to change the condition or function of corresponding hardware or software. If the failure state is determined the electrical control unit 200 can change to failsafe operation e.g. to interrupt processes or trigger additional safety actions or arrangements such as anti-lock braking system (ABS), electric power steering (EPS), traction control system (TCS), autonomous parking, hill holder, electric engine control and others.

According to the embodiment, the electrical control unit 200 is further configured to transmit a reset signal if the failure state is determined where the reset signal causes the wheel speed sensor to reset. Resetting the wheel speed sensor may be for example initializing the position of the wheel compared to the wheel speed sensor, calibrating the wheel speed sensor, rebooting the wheel speed sensor, turning off the wheel speed and much more.

An embodiment of a wheel speed sensor 202, comprises an input interface 204 configured to receive high-resolution data and low-resolution data for an angle measured by the wheel speed sensor 202. The wheel speed sensor 202 further comprises circuitry 206 configured to determine information on a functional state of the wheel speed sensor 202 using the high-resolution data and the low-resolution data.

According to the embodiment, the wheel speed sensor 202 is further configured to automatically reset if the failure state is determined. For example, if a persistent failure state is determined, the wheel speed sensor 202 can change automatically in function, state, processing or in other ways.

Figure 3:
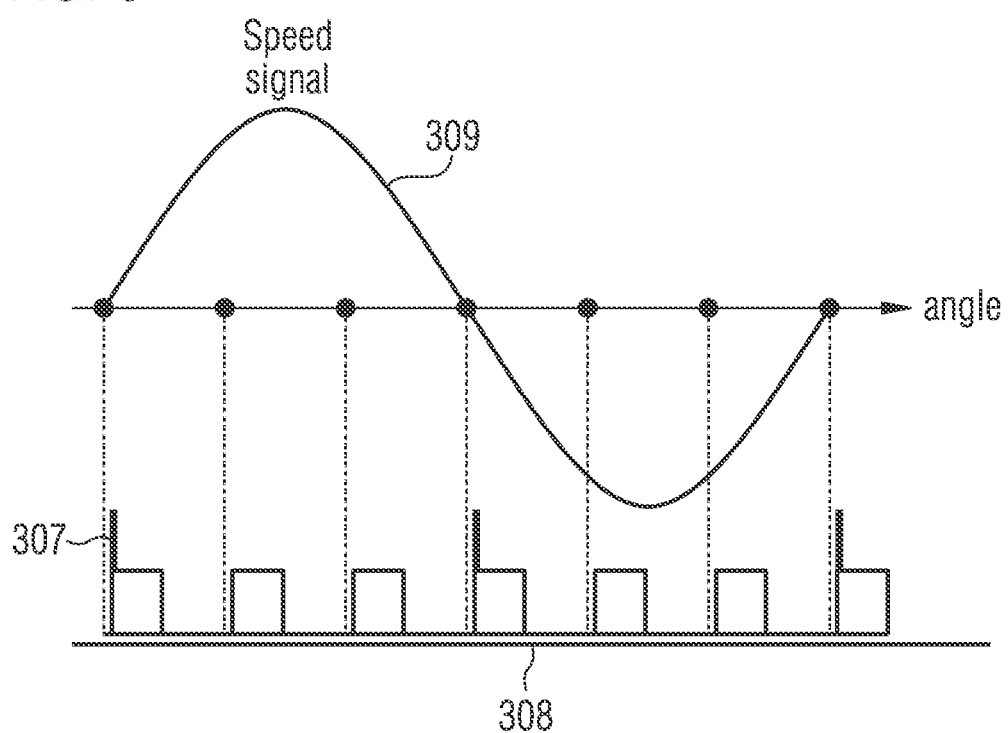
FIG. 3 illustrates an example for high-resolution data and low-resolution data of a wheel speed sensor.

For better understanding an application of the control circuit or the electrical control unit is discussed in more detail in FIG. 3 using a particular example of a data transmission protocol. An input interface receives low-resolution data by means of signals of a first signal type given by peak 307 and high-resolution data by means of signals of a second signal type given by peak 308. The protocol may, for example, distinguish between the different signal types by means of their different height or amplitude. Low-resolution data indicates zero-crossings of a speed signal 309. The speed signal may be generated by a sensor element measuring the field strength variations caused by wheel 201. High-resolution data indicates equally spaced phases of the sinusoidal signal 309 and, hence, the rotation of the wheel 201 with a higher resolution. In the example of FIG. 3, the expected number of high-resolution events 308 between two subsequent low-resolution events 307 equals N=2 if the wheel moves in the same direction.

A deviation of the number of high-resolution events as compared to the low-resolution events may be due to four different scenarios. In the first scenario the sensor indicates additional zero-crossings. In the second scenario, the sensor loses a zero-crossing. In the third scenario, the sensor provides an additional high-resolution event. And in the fourth scenario, the sensor loses a high-resolution event.

If between two zero-crossing events/protocols there are less than N=2 high-resolution events/protocols it means that either the first scenario or the fourth scenario have been violated. This means that a zero-crossing protocol has been added or a high-resolution protocol has been lost.

If more than N=2 high-resolution protocols are observed consecutively in the same direction, it means that either the second scenario or the third scenario has been violated. This means, that a zero-crossing protocol has been lost or a high-resolution protocol has been added.

Each scenario corresponds to a deviation from an expected ratio of events. As a consequence, a failure state of the sensor is determined by the circuitry. For example, a safety mechanism can be activated to inform the electronic control unit and to bring a system into a safe state. If the failure state persists the electrical control unit can act as a watchdog transmitting a reset signal causing the wheel speed sensor to reset.

FIGS. 4 to 7 illustrate examples for high and low-resolution data deviating from an expectation. All figures use the signals introduced in FIG. 3. In the event a failure state is determined, the figures further illustrate a failure signal 400 that is generated for the duration the failure persists.

Figure 4:
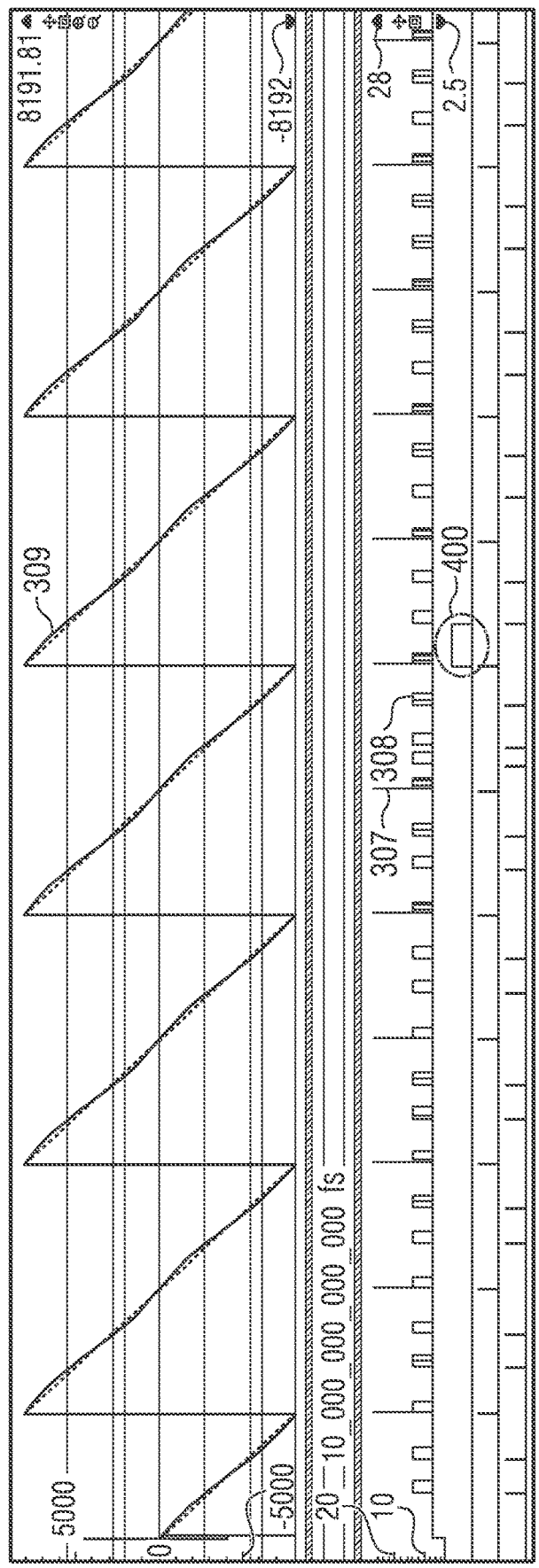
FIG. 4 illustrates a first example for inconsistent high and low-resolution data of the wheel speed sensor.

FIG. 4 illustrates the generation of the failure signal 400 since too many high-resolution events are received between two consecutive low-resolution events.

Figure 5:
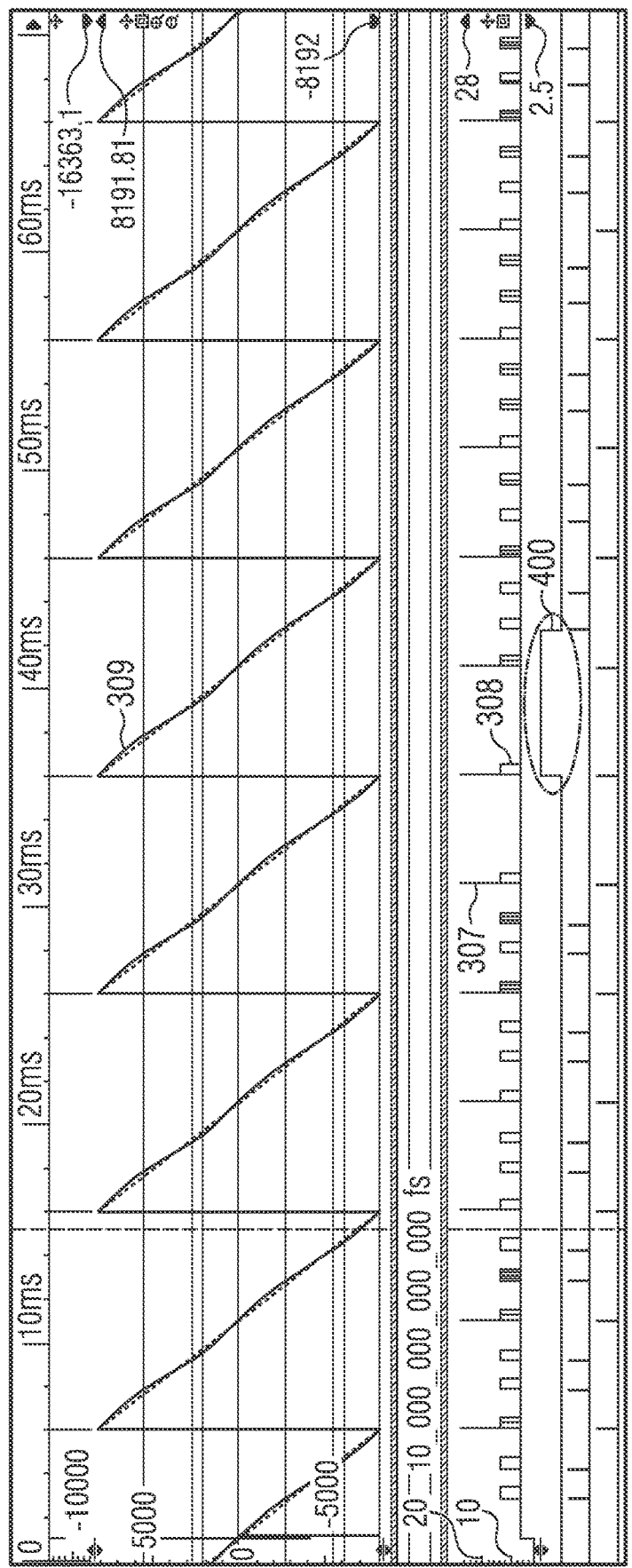
FIG. 5 illustrates a second example for inconsistent high and low-resolution data of the wheel speed sensor.

FIG. 5 illustrates the generation of the failure signal 400 since too few high-resolution events or protocols are received between two subsequent low-resolution events.

Figure 6:
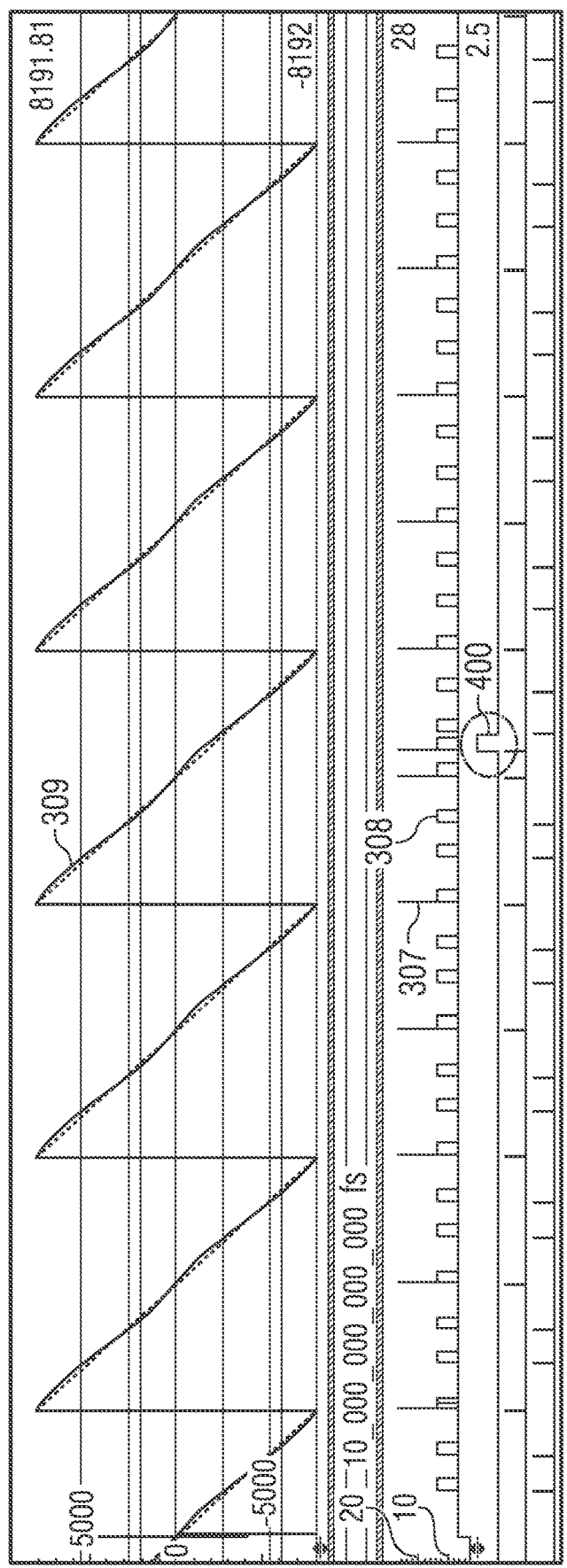
FIG. 6 illustrates a third example for inconsistent high and low-resolution data.

FIG. 6 illustrates the generation of the failure signal 400 since too many low-resolution events are received.

Figure 7:
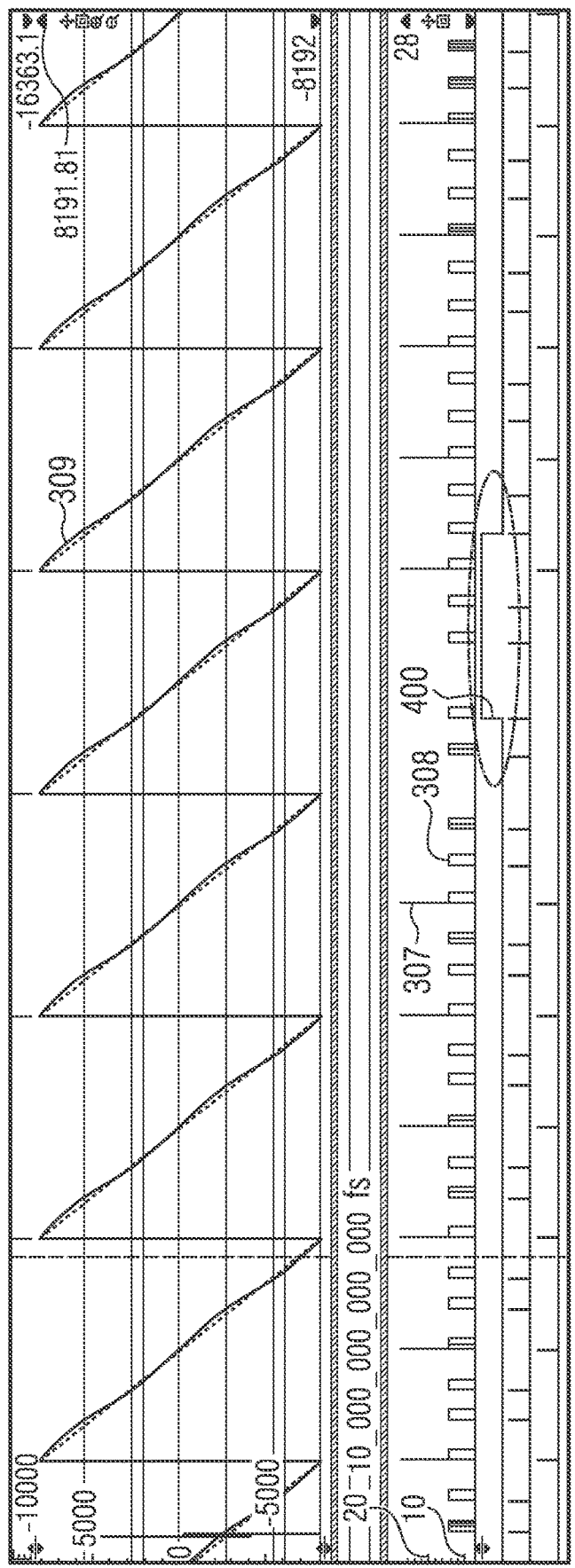
FIG. 7 illustrates a fourth example for inconsistent high and low-resolution data.

FIG. 7 illustrates the generation of the failure signal 400 since too few low-resolution events are received.

FIG. 8 illustrates a flow chart of an embodiment of a method of operating a wheel speed sensor 800. The method 800 comprises receiving high-resolution data and low-resolution data for an angle measured by the wheel speed sensor 801. The method further comprises determining information on a functional state of the wheel speed sensor using the high-resolution data and the low-resolution data 802.

FIG. 9 illustrates another flow chart of an embodiment of a method for controlling a sensor 900. The method comprises receiving high-resolution data and low-resolution data for the sensed property 901. The method further comprises determining information on a functional state of the sensor using the high-resolution data and the low-resolution data 902.

Another embodiment of the invention comprises a computer program having a program code configured to cause performing a method according to the previously described control circuit or electrical control unit if the computer program is executed by a programmable hardware component.

For example, the previously described electrical control unit may be implemented by a program comprising an algorithm that checks if the sequence of zero-crossing protocols and high-resolution protocols is consistent with expectations. The algorithm can enable a safety mechanism or reset the sensor in case of a persistent failure state of the sensor remains, e.g. when the number of high-resolution protocols between two zero-crossing protocols is either too high or too low. The algorithm can prevent the violation of the described four scenarios e.g. due to systematic or random hardware error.

Embodiments of the invention can interact with a customer system. The sensor can be connected to the ECU, which can calculate the speed, rotational direction and movement of the target wheel. The sensor can provide an output signal encoded in AK or PWM protocol. Customers can use the information from the sensor for various applications such as automotive features as described before. Embodiments of the invention can be used also in other applications such as for transmission, engine or angle sensors. Embodiments of control circuits or ECUs may improve the safety concept of sensors and hence also the safety performance of a full system. As an example, a high-resolution wheel speed sensor with extended cross check mechanism can be developed to improve an already existing wheel speed sensor. An accordingly upgraded Sensor may enable autonomous driving and parking applications at a high safety level.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for something" may be implemented as a "means configured to or suited for something", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudocode, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub-acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A control circuit for a wheel speed sensor, the control circuit comprising:
   an input interface configured to receive high-resolution wheel speed data and low-resolution wheel speed data; and
   circuitry configured to determine information on a functional state of the wheel speed sensor using the high-resolution wheel speed data and the low-resolution wheel speed data,
      wherein the circuitry is configured to evaluate the low-resolution wheel speed data, and detect a first signal event and a second signal event signaled by the low-resolution wheel speed data, and
      wherein the circuitry is configured to evaluate the high-resolution wheel speed data, determine a number of signal events which are signaled by the high-resolution wheel speed data between the first signal event and the second signal event, and detect a failure state of the wheel speed sensor if the number of signal events which are signaled by the high-resolution wheel speed data between the first signal event and the second signal event deviates from an expected number.

2. The control circuit according to claim 1, wherein the circuitry is configured to determine a direction of rotation of a wheel that is associated with the high-resolution wheel speed data and the low-resolution wheel speed data, and
   wherein the circuitry is configured to detect the failure state of the wheel speed sensor if the number of signal events which are signaled by the high-resolution wheel speed data between the first signal event and the second signal event deviates from the expected number and if the signal events corresponding to the number of signal events are signaled while the wheel rotates in a same direction of rotation.

3. The control circuit according to claim 1, wherein the circuitry is configured to detect the failure state if the circuitry detects one of the following:
   the number of signal events signaled by the high-resolution wheel speed data between the first signal event and the second signal event are signaled during a same rotation direction and the number of signal events is less than the expected number, or
   the number of signal events signaled by the high-resolution wheel speed data are signaled during a same rotation direction, the number of signal events are signaled without a signal event signaled by the low-resolution wheel speed data occurring between the first signal event and the second signal event, and the number of signal events exceeds the expected number.

4. The control circuit according to claim 1, wherein the low-resolution wheel speed data indicates amplitude threshold crossings of a speed signal associated with a rotation of a wheel, and
   the high-resolution wheel speed data indicates occurrences of equally spaced phases of the speed signal.

5. The control circuit according to claim 1, wherein the circuitry is configured to, based on detecting the failure state, change to a failsafe operation mode and trigger one or more safety operations.

6. The control circuit according to claim 1, wherein the circuitry is configured to, based on detecting the failure state, transmit a reset signal for resetting the wheel speed sensor.

7. The control circuit according to claim 1, wherein the circuitry is configured to, based on the high-resolution wheel speed data and the low-resolution wheel speed data, determine an angle of a wheel associated with the wheel speed sensor.

8. A control circuit for a wheel speed sensor, the control circuit comprising:
   an input interface configured to receive high-resolution wheel speed data and low-resolution wheel speed data; and
   circuitry configured to determine information on a functional state of the wheel speed sensor using the high-resolution wheel speed data and the low-resolution wheel speed data,
      wherein the circuitry is configured to evaluate the low-resolution wheel speed data, and detect a first signal event and a second signal event signaled by the low-resolution wheel speed data,
      wherein the circuitry is configured to evaluate the high-resolution wheel speed data to determine a number of consecutive signal events which are signaled by the high-resolution wheel speed data between the first signal event and the second signal event, and
      wherein the circuitry is configured to detect a failure state of the wheel speed sensor if the number of consecutive signal events deviates from an expected number.

9. The control circuit according to claim 8, wherein the number of consecutive signal events correspond to a same rotation direction of a wheel that is associated with the high-resolution wheel speed data and the low-resolution wheel speed data.

10. The control circuit according to claim 8, the circuitry is configured to monitor a rotation direction of a wheel that is associated with the high-resolution wheel speed data and the low-resolution wheel speed data and count the consecutive signal events that occur between the first signal event and the second signal event while the wheel rotates in a same rotation direction to determine the number of consecutive signal events.

11. The control circuit according to claim 10, wherein the consecutive signal events corresponding to the number of consecutive signal events occur without a signal event signaled by the low-resolution wheel speed data being signaled between the first signal event and the second signal event.

12. The control circuit according to claim 8, wherein the circuitry is configured to detect the failure state if the circuitry detects one of the following:
the number of consecutive signal events signaled by the high-resolution wheel speed data between the first signal event and the second signal event are signaled during a same rotation direction of a wheel and the number of consecutive signal events is less than the expected number, or
the number of consecutive signal events signaled by the high-resolution wheel speed data are signaled during a same rotation direction, the number of consecutive signal events are signaled without a signal event signaled by the low-resolution wheel speed data occurring between the first signal event and the second signal event, and the number of consecutive signal events exceeds the expected number.

13. A method of operating a control circuit of a wheel speed sensor, comprising:
receiving high-resolution wheel speed data and low-resolution wheel speed data; and
determining a functional state of the wheel speed sensor using the high-resolution wheel speed data and the low-resolution wheel speed data, including:
evaluating the low-resolution wheel speed data for detecting a first signal event and a second signal event signaled by the low-resolution wheel speed data;
evaluating the high-resolution wheel speed data to determine a number of signal events which are signaled by the high-resolution wheel speed data between the first signal event and the second signal event; and
detecting a failure state of the wheel speed sensor if the number of signal events which are signaled by the high-resolution wheel speed data between the first signal event and the second signal event deviates from an expected number.

14. The method according to claim 13, further comprising:
determining a direction of rotation of a wheel that is associated with the high-resolution wheel speed data and the low-resolution wheel speed data, and
detecting the failure state of the wheel speed sensor if the number of signal events which are signaled by the high-resolution wheel speed data between the first signal event and the second signal event deviates from the expected number and if the signal events corresponding to the number of signal events are signaled while the wheel rotates in a same direction of rotation.

15. The method according to claim 13, wherein detecting the failure state includes:
detecting the failure state if the number of signal events signaled by the high-resolution wheel speed data between the first signal event and the second signal event are signaled during a same rotation direction and the number of signal events is less than the expected number, or
detecting the failure state if the number of signal events signaled by the high-resolution wheel speed data are signaled during a same rotation direction, the number of signal events are signaled without a signal event signaled by the low-resolution wheel speed data occurring between the first signal event and the second signal event, and the number of signal events exceeds the expected number.

16. The method according to claim 13, further comprising:
detecting a non-failure state of the wheel speed sensor if the number of signal events which are signaled by the high-resolution wheel speed data between the first signal event and the second signal event is equal to the expected number.

17. A system, comprising:
a wheel speed sensor configured to:
sense a property associated with a rotation of a wheel,
generate a wheel speed signal based on the property, the wheel speed signal being a sinusoidal signal,
generate high-resolution wheel speed data and low-resolution wheel speed data based on the wheel speed signal, the high-resolution wheel speed data and low-resolution wheel speed indicating respective signal events,
detect amplitude threshold crossings of the wheel speed signal, and signal a respective signal event associated with the low-resolution wheel speed data for each instance the wheel speed signal crosses an amplitude threshold, and
detect a phase of the wheel speed signal, and signal a respective signal event associated with the high-resolution wheel speed data for each instance the phase of the wheel speed signal is equal to one of a plurality of equally spaced phases; and
a control circuit comprising circuitry configured to determine information on a functional state of the wheel speed sensor using the high-resolution wheel speed data and the low-resolution wheel speed data.

18. The system of claim 17, wherein the circuitry is configured to evaluate the low-resolution wheel speed data, and detect a first signal event and a second signal event signaled by the low-resolution wheel speed data, and
wherein the circuitry is configured to evaluate the high-resolution wheel speed data, determine a number of signal events which are signaled by the high-resolution wheel speed data between the first signal event and the second signal event, and detect a failure state of the wheel speed sensor if the number of signal events which are signaled by the high-resolution wheel speed data between the first signal event and the second signal event deviates from an expected number.

19. The system of claim 18, wherein the first signal event and the second signal event are consecutive signal events signaled in the low-resolution wheel speed data.

20. The system of claim 17, wherein the property is a magnetic field that changes based on the rotation of the wheel, and wherein the wheel speed sensor includes at least one sensor element configured to measure the magnetic field for generating the wheel speed signal.

\* \* \* \* \*